United States Patent
Chouly et al.

[11] Patent Number: 6,052,821
[45] Date of Patent: Apr. 18, 2000

[54] TRELLIS CODED QAM USING RATE COMPATIBLE, PUNCTURED, CONVOLUTIONAL CODES

[75] Inventors: Antoine Chouly, Paris; Américo Brajal, Villeneuve-le-Roi; David Gianella, Dannemarie, all of France

[73] Assignee: U.S. Philips Corporation, New York, N.Y.

[21] Appl. No.: 09/011,565

[22] PCT Filed: Jun. 23, 1997

[86] PCT No.: PCT/IB97/00756

§ 371 Date: Feb. 13, 1998

§ 102(e) Date: Feb. 13, 1998

[87] PCT Pub. No.: WO97/50218

PCT Pub. Date: Dec. 31, 1997

[30] Foreign Application Priority Data

Jun. 26, 1996 [FR] France .................................. 96 07938

[51] Int. Cl.[7] ................................................. H03M 13/12
[52] U.S. Cl. ........................................... 714/790; 375/265
[58] Field of Search .................................. 714/790, 786; 375/265

[56] References Cited

U.S. PATENT DOCUMENTS 5,408,502   4/1995   How ........................................ 375/340
5,555,547   9/1996   Lemaitre et al. ....................... 375/262

FOREIGN PATENT DOCUMENTS 0 540 232   5/1993   European Pat. Off. .
0 624 019  11/1994   European Pat. Off. .

OTHER PUBLICATIONS

Viterbi et al., "A Pragmatic Approach to Trellis–Coded Modulation", IEEE Communications Magazine, Jul. 1989, pp. 11–19.

Wolf et al., "P2 Codes: Pragmatic Trellis Codes Utilizing Punctured Convolutional Codes", IEEE Communications Magazine, Feb. 1995, pp. 94–99.

PCT International Search Report, PCT/IB97/00756, Sep. 1997.

Eroz et al., "A Multiple Trellis–Coded Hybrid ARQ Scheme for Land–Mobile Communication Channels", Proc. MIL-COM Nov. 1995, pp. 496–500.

Kim et al., "On Puncture Trellis–Coded Modulation", Proc. ICC, Jun. 1995, pp. 678–682.

Cremonesi et al., "An Adjustable–Rate Multilevel Coded Modulation System: Analysis and Implementation", European Transactions on Telecommunications and Related Technologies, vol. 4, No. 3, May 1993, pp. 277–283.

Jung–Fu et al., "Complexity–Reduced Multilevel Coding with Rate–Compatible Punctured Convolutional Codes", Proc. GLOBECOM, Nov. 1993, pp. 814–818.

"Rate–compatible punctured convolutional codes (RPC codes) and their applications", IEEE Transactions on Communications, J. Hagenauer, vol. 36, No. 4, Apr. 1998, pp. 389–399.

Primary Examiner—Stephen M. Baker
Attorney, Agent, or Firm—Leroy Eason

[57] ABSTRACT

A digital transmission system provides selective protection by combining a convolutional coding, a punctured coding and a digital quadrature amplitude modulation. The rate of the convolutional coding in N/2N and the modulation uses a $2^{2N}$-point constellation, with N>1.

16 Claims, 6 Drawing Sheets

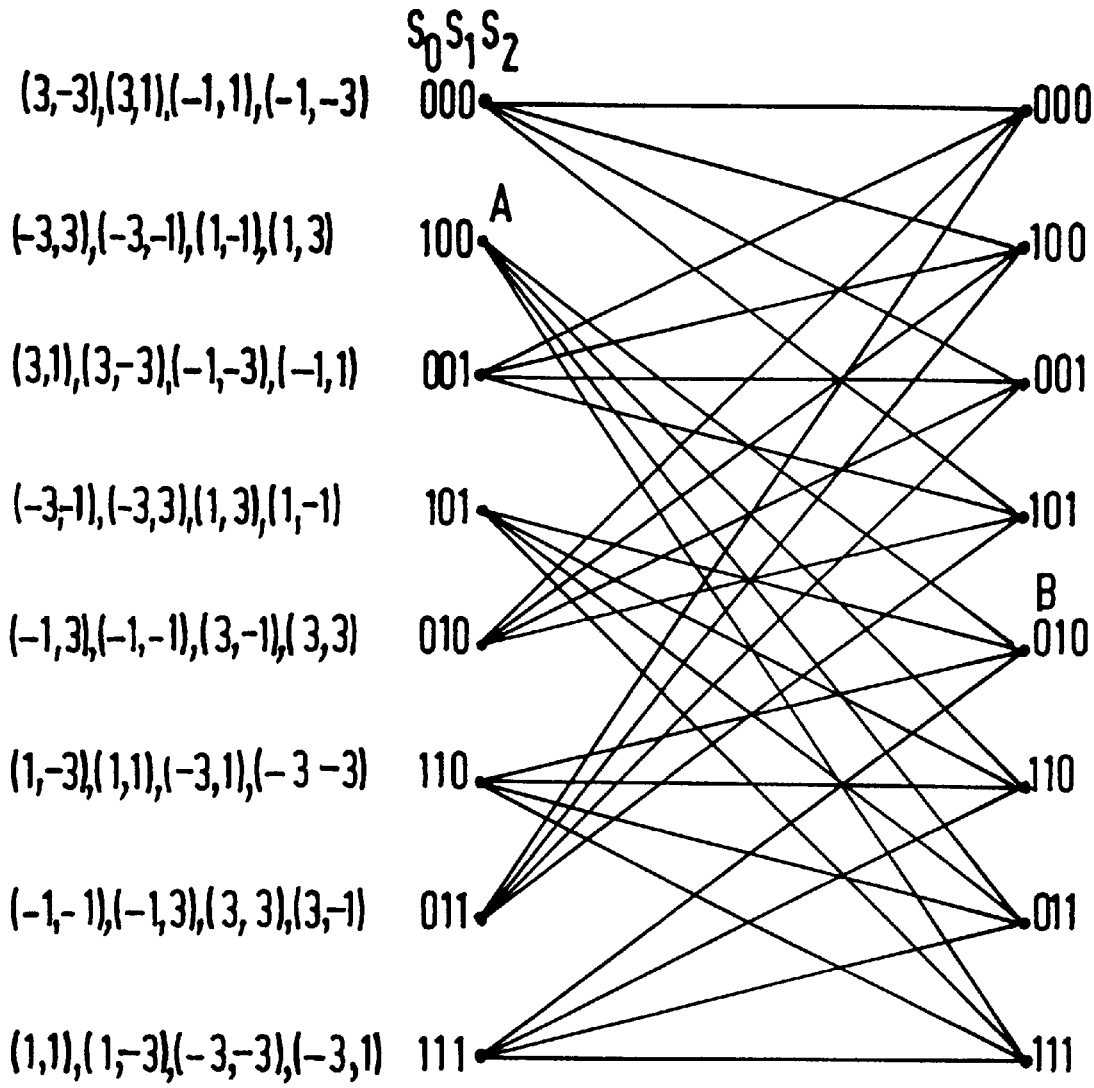
FIG.7
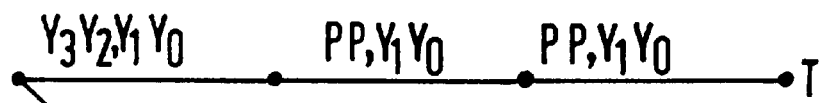
FIG.8

TRELLIS CODED QAM USING RATE COMPATIBLE, PUNCTURED, CONVOLUTIONAL CODES

FIELD OF THE INVENTION

The invention relates to a selective protection digital transmission system comprising a transmitter and a receiver, the transmitter including first convolutional coding means for coding data, second coding means for applying a coding by puncturing and means for allocating the coded data to digitally modulated symbols.

The invention likewise relates to a transmitter and a receiver used in such a system and to a selective protection method. The system may be used for digital transmission for cable television, satellite television or others.

BACKGROUND OF THE INVENTION

Such a system comprises sources which produce various bit streams which it is to protect differently against the errors due to imperfections of the transmission channel. The tolerated error rate depends on each bit stream. For example, a source may produce three bit streams which it is to transmit with the respective maximum error rates of $10^{-4}$, $10^{-7}$ and $10^{-11}$.

A customary method for having a selective protection comprises utilizing different codes for each bit stream. The transmitted signal is then obtained by a time-division multiplexing of the various coded signals coming from various bit streams. For example, error correction codes may be used whose correction capacity is adjusted as a function of the required error rate. This approach has two drawbacks:

the decoding requires a different decoder for each bit stream, leading to much hardware complexity;

the coding does not depend on the modulation used, which does not provide optimum performance in terms of error rate as a function of the signal-to-noise ratio. For an error rate and a fixed rate, the signal-to-noise ratio is not minimized.

The first drawback has been suppressed in the systems utilizing the punctured codes described in the article: "Rate-compatible punctured convolutional codes (RCPC codes) and their applications", IEEE Transactions on Communications, *J. Hagenauer,* vol. 36, No. 4, April 1988, pp. 389–399. The principle consists of utilizing a single convolutional code (called mother code) having a 1/2 rate or 1/3 rate, the same for all the bit streams, and of applying a different punctured coding for each stream. The punctured coding consists in this article of periodically prohibiting the transmission of certain bits as a function of a matrix, called puncturing matrix. Thus, the rate of the punctured coding becomes higher than that of the non-punctured coding. This document relates to PSK2 or PSK4 phase modulations.

At the receiving end, the decoding is performed by computing metrics of the symbols received in the baseband coming from each bit stream. The computation of the metrics depends on the puncturing matrix, thus on the bit stream. The transmitted bits are estimated by a Viterbi decoder shared for the processing of all the signals that correspond to the various bit streams.

The drawback of the codes having a 1/2 rate is that they are only adapted to low-efficiency spectral modulations (less than or equal to two bits/s/Hz) as PSK2 and PSK4 phase modulations. Corresponding to these modulations is a bit rate equal to the maximum of twice the band used. For increasing the rate for a fixed seized band, one could seek to utilize high-efficiency spectral modulations of the QAM type (Quadrature Amplitude Modulation). But the use of the punctured convolutional codes having a 1/2 rate described by *J. Hagenauer* placed side by side with QAM modulations does not yield optimum performance, because these codes have been devised independently of the modulation.

SUMMARY OF THE INVENTION

It is thus an object of the invention to enhance the performance of such a transmission system by guaranteeing a correct operation of the system with a minimum signal-to-noise ratio by improving the spectral efficiency of the system.

This object is achieved with a system in which the first coding means provide a convolutional trellis coding having an N/2N rate, where N is an integer greater than 1, while the convolutional coding is combined with a $2^{2N}$-state quadrature amplitude modulation and the puncturing coding is applied to the symbols.

The invention likewise relates to a transmitter and a receiver utilized in such a system.

Preferably, the convolutional coding has a 2/4 rate, which coding is combined with a QAM16 digital modulation, the coding and the puncturing being combined for producing optimum performance. Such a coding is obtained by processing each bit stream in which bits (called input bits) are taken two by two to code them into four bits (called output bits). Therefore, two input bits $X_0$ and $X_1$, taken from the bit stream under consideration enter a respective bank of shift cells which produce each a delay of one symbol period T characteristic of the modulation used. By linearly combining the bits $X_0$ and $X_1$ with previous versions of the bits $X_0$ and $X_1$, the output bits $Y_0, Y_1, Y_2, Y_3$ are determined. According to a preferred embodiment, the first coding means comprise three shift cells.

The system is preferably based on convolutional mother codes having a 2/4 rate, that is to say that for two information bits, four bits coded according to the internal state of the coder and of the two information bits are generated. The four output bits select two four-level symbols (+1, −1, +3, −3), that is to say, two real symbols having the four-level 4-AM amplitude modulation (two output bits per symbol). By combining these two real symbols, a complex symbol of the QAM16 constellation is obtained. After the coder, a puncturing is applied with the two 4-AM output symbols and not with the bits as is the case for punctured codes with the state-of-the-art PSK4 modulation. The puncturing is defined by a puncturing matrix M. The coded data are then transmitted by a carrier according to habitual techniques.

The convolutional codes having a 2/4 rate to be described hereafter are designed so that after puncturing they are optimum codes, that is to say, that they give the lowest error rate for a given signal-to-noise ratio and specifically for the 4-AM or QAM16 modulation.

In this manner, a system is obtained having optimum performance both with respect to the signal-to-noise ratio and the spectral efficiency by combining a coder structure which realizes the convolutional coding in optimum manner having a 2/4 rate, with a puncturing matrix realizing the puncturing in optimum fashion. The structure and the matrix are optimized for operating together. The optimum puncturing matrix depends on the final rate searched for.

According to the invention this actually relates to a combination of a convolutional coding with a quadrature amplitude modulation and not to a juxtaposition.

This system has the following advantages:

compared with a system using the binary punctured codes with a PSK4 phase modulation, a twice higher transmission capacity is provided (spectral efficiency between two and four bits/s/Hz);

compared with a system using the conventional punctured codes associated to a QAM modulation, there is a more optimized performance in terms of error rates;

the system does not have much hardware complexity because a single Viterbi decoder is necessary to decode the various data streams which correspond to the various protection levels;

the codes used are preferably 2/4 convolutional codes with two input bits and four output bits. The function generating the four output bits in response to the input bits and state (memory) of the coder has been optimized in view of the QAM16 modulation;

the puncturing is applied to 4-AM symbols, that is to say, real symbols assuming four possible values (+1, −1, +3, −3) and not to bits as is the case with the prior-art puncturing;

the convolutional codes having a 2/4 rate are chosen in such a way that the minimum euclidian distance of the code 2/4 combined with the QAM16 modulation is maximized. The same holds for the minimum euclidian distance of the punctured code 2/4 combined with the QAM16 modulation. This makes the combination of the codings come under the heading of the modulation.

The invention also relates to a selective protection method utilized in a digital transmission system, the method comprising the following steps of:

convolutional coding of input data into output data, puncturing of the convolutional coding by applying at least one puncturing matrix, allocating data to digitally modulated symbols, characterized in that the convolutional coding is a convolutional trellis coding having an N/2N rate, where N is an integer greater than 1, while the convolutional coding is combined with a $2^{2N}$-state quadrature amplitude modulation and the puncturing coding is applied to the symbols. The convolutional trellis coding and the puncturing coding are combined to provide optimum performance.

It is also possible to utilize punctured convolutional codes having a different rate. Thus, according to another embodiment, the convolutional coding has a 3/6 rate, which coding is combined with a digital QAM64 modulation, the coding and the puncturing being combined to produce optimum performance by providing that the minimum euclidian distance of the code 3/6 combined with the QAM64 modulation is maximized. The additional advantages reside in obtaining a better spectral efficiency (higher rates in the same band) and also better performance.

To realize the convolutional coder having an N/2N rate, the first coding means comprise shift cells for delaying the input data and means for linearly combining the input data with the delayed input data to produce output data.

These and other aspects of the invention will be apparent from and elucidated with reference to the embodiments described hereinafter.

BRIEF DESCRIPTION OF THE DRAWINGS

In the drawings:

FIG. 7 shows a trellis of an eight-state coder; and

FIG. 8 shows a trellis of trellis-punctured code paths.

DESCRIPTION OF THE EMBODIMENTS

Figure 1:
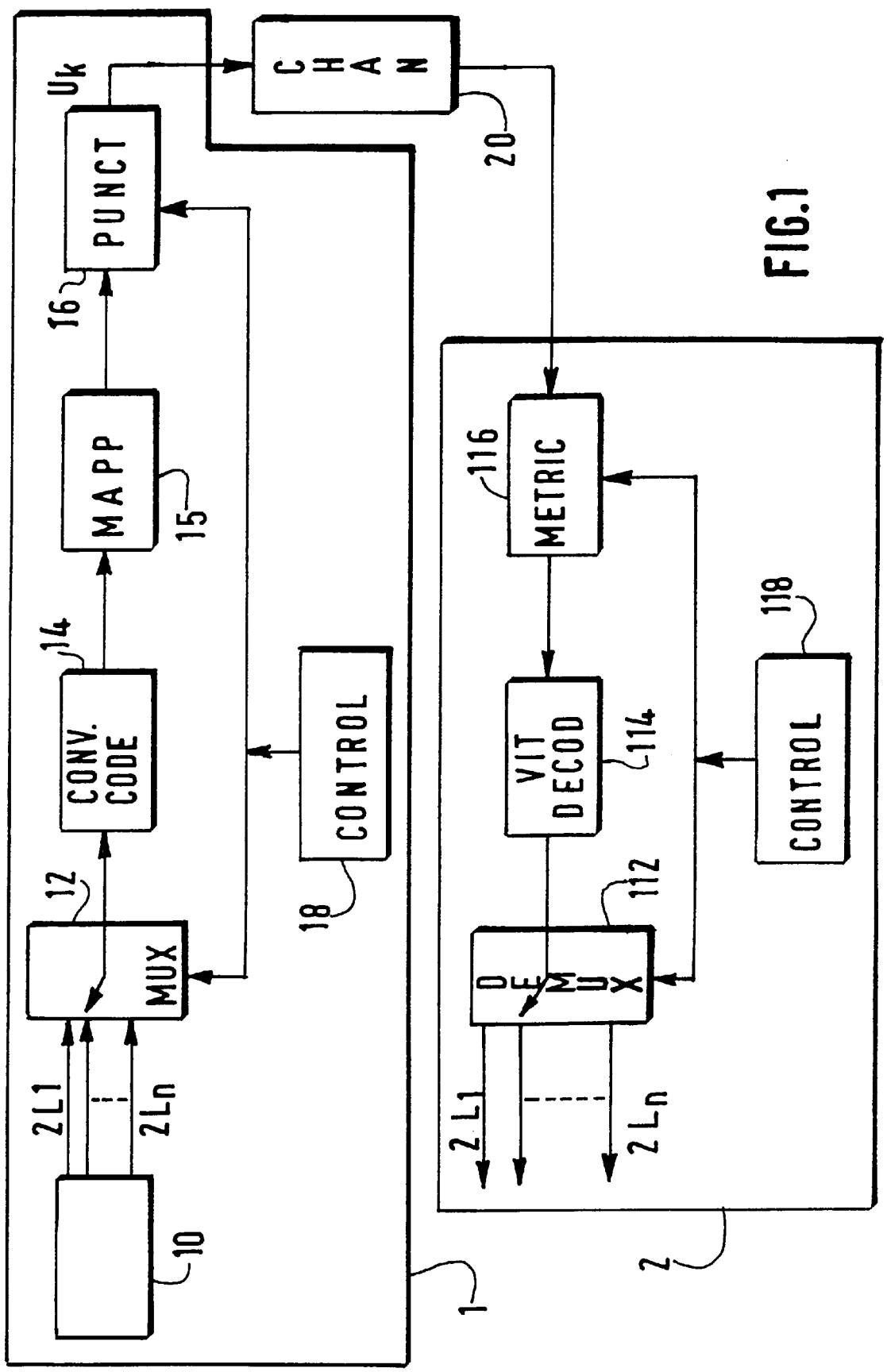
FIG. 1 a diagram of a baseband transmission system.

FIG. 1 shows a general block diagram of a baseband transmission system. The system comprises a transmitter 1 and a receiver 2. The transmitter comprises a source 10 which produces various bit streams 2L1, 2L2, ... 2Ln. It is the object of the invention to protect each bit stream differently. The transmitted signal is formed by multiplexing packets of different sizes coming from the various bit streams: 2L1 bits of the first stream, 2L2 bits of the second stream ... 2Ln bits of the $n^{th}$ stream. The bit streams may be selected by a multiplexer MUX 12 which distributes the bit streams to a coder 14, which is shared for processing all the bit streams. The succession of the bit streams is the following:

[2L1] [2L2] ... [2Ln] [2L1] [2L2] ...

Preferably, the coder 14 carries out a convolutional trellis coding having a 2/4 rate. The bits produced by the coder 14 are then grouped in pairs to form the symbols I and Q. These symbols are then transformed into QAM16 Quadrature Amplitude Modulation symbols in a mapping device MAPP15. On the output of the device MAPP, the puncturing is applied in a second coder PUNCT 16. The puncturing is split up into a first puncturing defined by the matrix M1 affecting the 2L1 coded bits of the first bit stream, and after that by a second puncturing defined by a matrix M2 affecting the 2L2 coded bits of the second bit stream, ... and so on, up to the 2Ln coded bits of the $n^{th}$ bit stream. The puncturing is obtained by applying puncturing matrices which are a priori different for each bit stream. In this manner, protections are obtained having different error rates. A controller CONTROL 18 manages all the coding operations.

The symbols of the digital modulation are then transmitted by a modulator (not shown) through a channel CHAN 20 to a receiver. After the received signals (not shown) are demodulated, the symbols are processed by a metric computation unit METRIC 116. The metrics enter a Viterbi decoder 114 which performs a conventional Viterbi decoding. The bit streams produced by the Viterbi decoder are then demultiplexed in a demultiplexer DEMUX 114 to produce estimates that correspond to the transmit bit streams. A controller CONTROL 118 manages the various decoding operations.

The system provides the advantage of utilizing a single convolutional coder at the transmitting end and a single Viterbi decoder at the receiving end.

Figure 2:
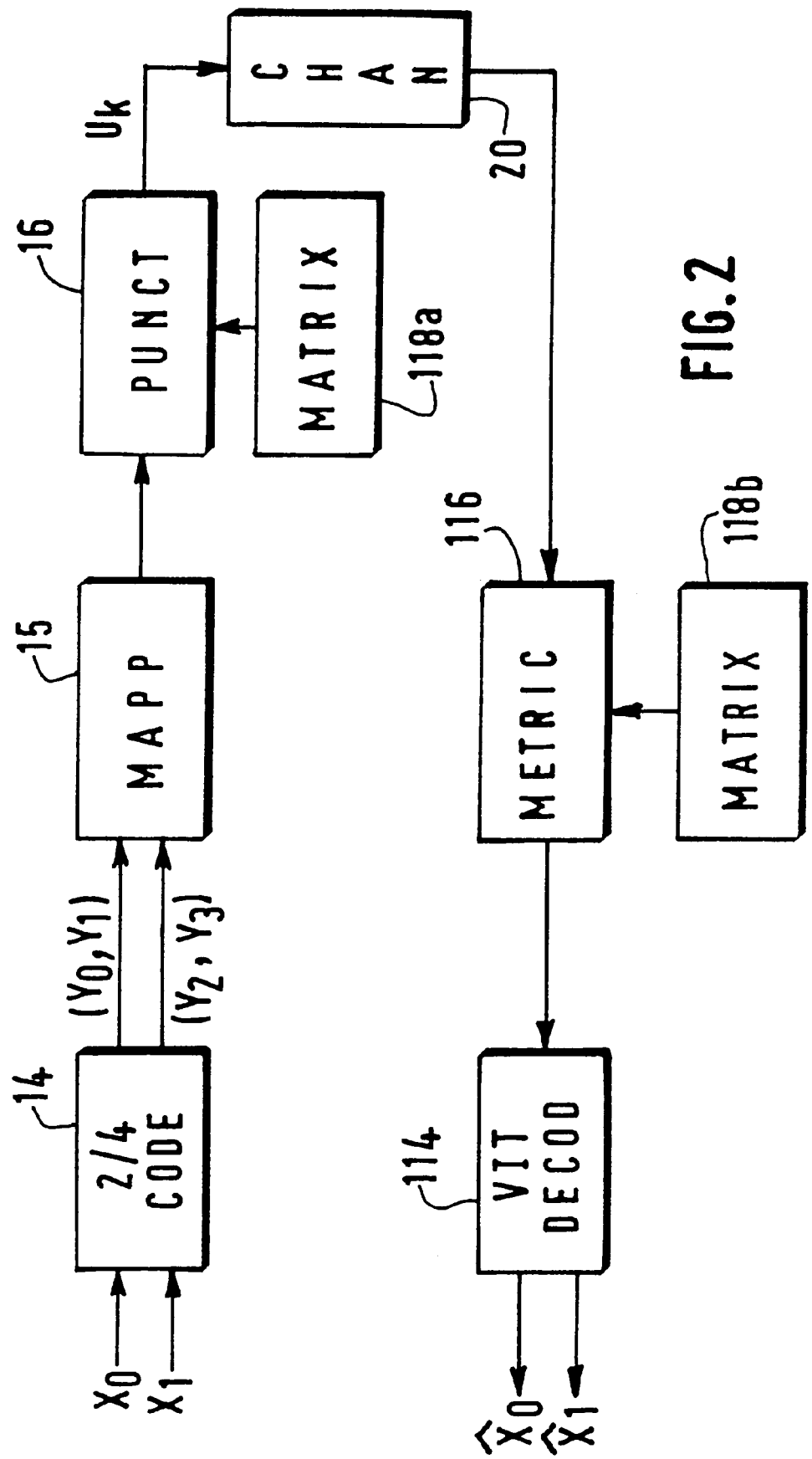
FIG. 2 a simplified diagram of a system comprising a convolutional coder having a 2/4 rate.

FIG. 2 represents a simplified diagram of a system in which two input data $X_0$ and $X_1$ taken from one of the bit streams are coded into four data $Y_0$, $Y_1$, $Y_2$, $Y_3$ by a trellis coder 14 having a 2/4 rate. The output data are regrouped in pairs $Y_0$, $Y_1$ and $Y_2$, $Y_3$ respectively, one pair being allocated to the in-phase component and the other pair to the quadrature component of a QAM16 modulation. This allocation is effected in the mapping device 15. Thereafter, the puncturing is realized by taking from a storage unit 118a the puncturing matrix to be applied to the bit stream from which the input data $X_0$ and $X_1$ originate. At the receiving end, the same puncturing matrix is used for controlling the computation of the metrics. In the receiver, the matrix is stored in a storage unit 118b. The Viterbi decoder 114 produces two estimated data $\hat{X}_0$ and $\hat{X}_1$ which correspond to the input data $X_0$ and $X_1$.

Figure 3:
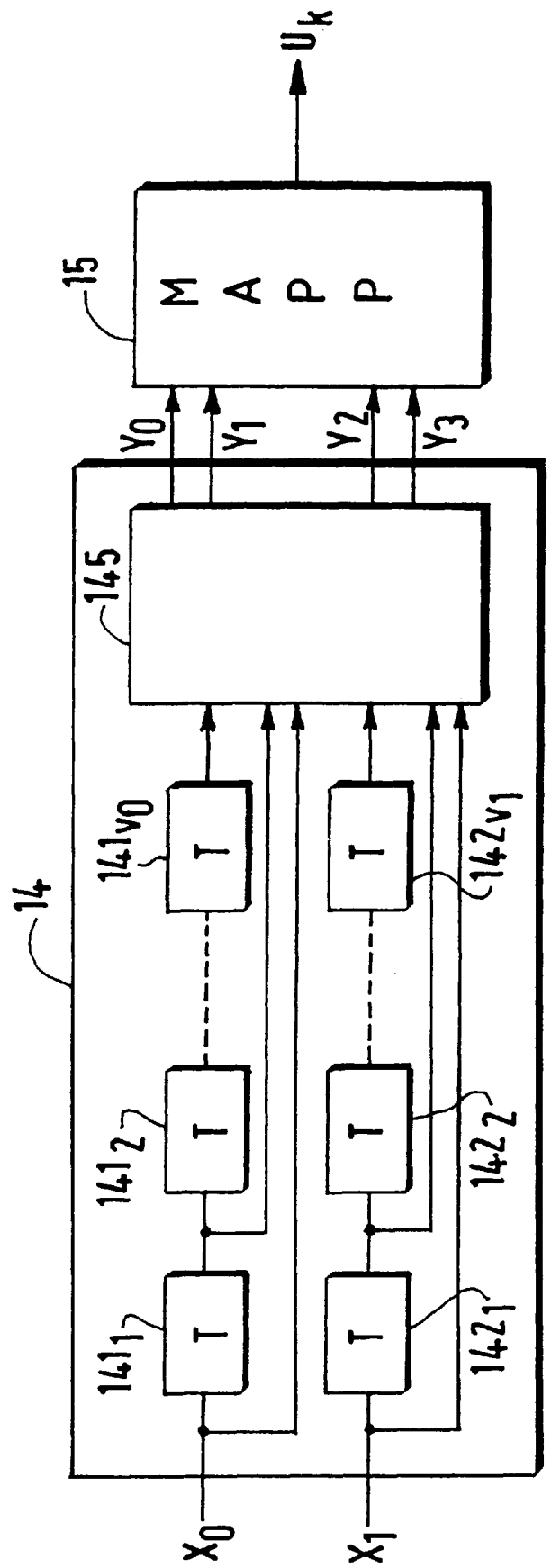
FIG. 3 shows a general diagram of a convolutional coder having a 2/4 rate.

A general diagram of a trellis coder 14 having a 2/4 rate is represented in FIG. 3 for coding two input data $X_0$ and $X_1$ into four output data $Y_0, Y_1, Y_2, Y_3$. The coder comprises a first bank of shift cells $\mathbf{141}_1, \mathbf{141}_2 \ldots \mathbf{141}_{v_0}$ to delay the data $X_0$ and a second bank of shift cells $\mathbf{142}_1, \mathbf{142}_2 \ldots \mathbf{142}_{v_1}$ to delay the data $X_1$. The input and output data of the shift cells enter a circuit 145 which linearly combines these data. The combining circuit 145 applies the output data $Y_0, Y_1, Y_2, Y_3$ to the mapping device 15 which produces the symbols $U_k$. Certain outputs of the shift cells may not be connected to the circuit 145. This is the case when the coefficients allocated thereto are equal to zero.

To obtain the convolutional coding, the data $X_0$ and $X_1$ are combined at an instant kT with these same data at previous instants shifted by a duration T, where T is the symbol duration. The coder is characterized by its length $v=v_0+v_1$, that is to say, its total number of shift cells. Thus a coder having v cells will have $2^v$ possible states.

In a general case, the input-output relations of a convolutional coder having a 2/4 rate are given by:

$$Y_j(kT) = \sum_{i=0}^{1} \sum_{p=0}^{v_i} h_{ij}^p X_i((k-p)T) \bmod 2 \quad (1)$$

where $v_i$ is the number of shift cells used by the coder to delay the data $X_i$;

i is the index of the input data $X_i$, i=0,1;

j is the index of the output data $Y_j$, j=0,1,2,3;

p is the sequence number of the cell in the bank of cells, for the data $X_i$, p=0,1,2 . . . $v_i$.

The coefficients $h_{ij}^p$ assume a value of 1 if there is a connection between the $p^{th}$ order shift cell and the $j^{th}$ order output. The coefficients assume a zero value in the opposite case. Thus, between the $i^{th}$ order input $X_i$ and the $j^{th}$ order output $Y_j$, the coefficients may be represented by a binary polynomial $h_{ij}(z)$.

Figure 4:
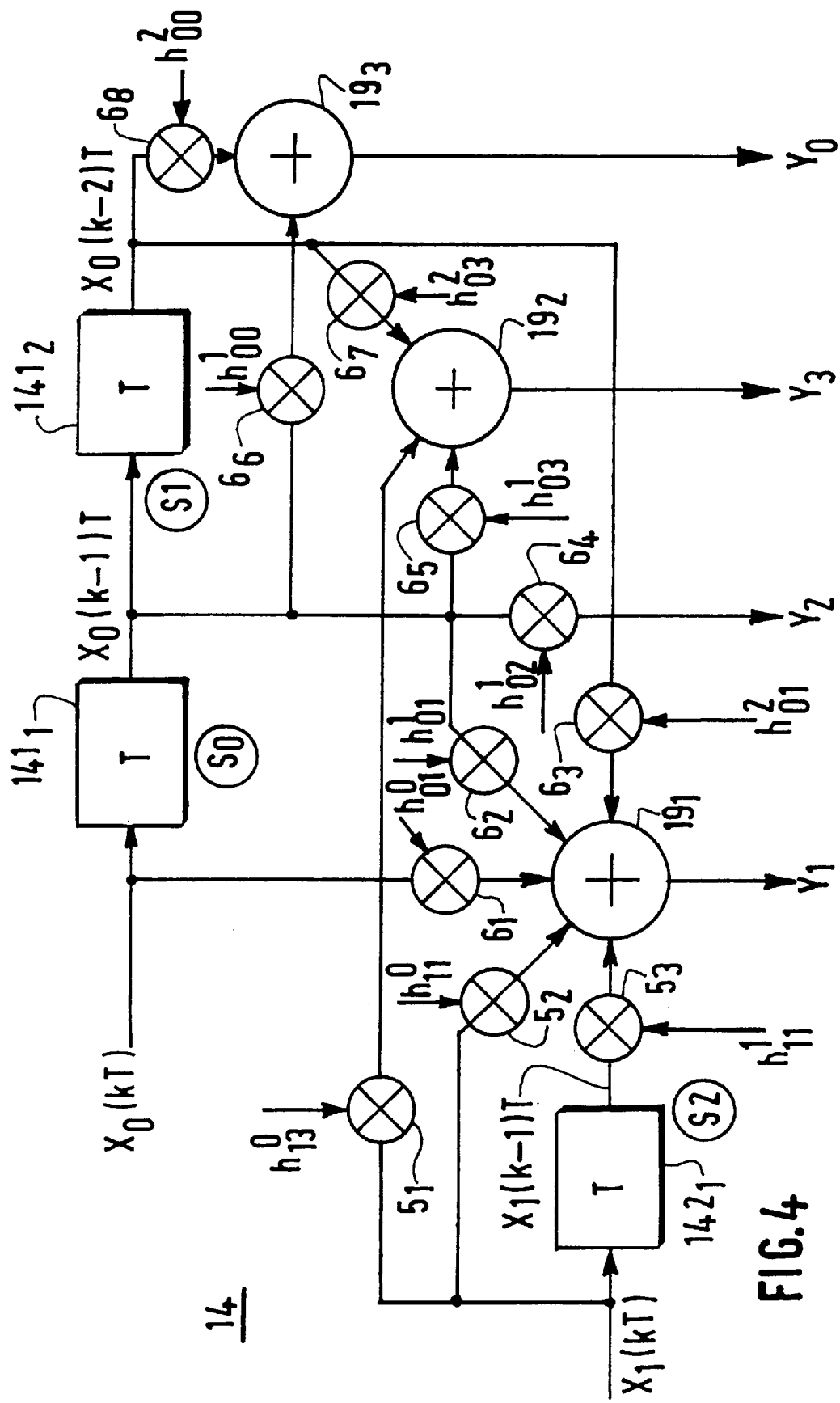
FIG. 4 shows a diagram of a particular convolutional coder having a 2/4 rate.

FIG. 4 represents a particular coder having a 2/4 rate which coder has three shift cells $\mathbf{141}_1, \mathbf{141}_2, \mathbf{142}_1$, that is v=3, for computing the four output bits $Y_0, Y_1, Y_2$ and $Y_3$. The coder is characterized by eight generator polynomials defined by:

$$h_{ij}(z) = \sum_{p=0}^{v_i} h_{ij}^p \cdot z^p \quad (2)$$

with i=0,1 and j=0,1,2,3.

In decimal notation, the coefficients of the polynomials are written as:

$$h_{ij} = \sum_{p=0}^{v_i} h_{ij}^p \cdot 2^p \quad (3)$$

with i=0,1 and j=0,1,2,3.

A particular convolutional coder having a 2/4 rate giving good performance in the scope of the invention possesses the following coefficients:

$h_{00}=6$; $h_{10}=0$; $h_{01}=7$; $h_{11}=3$;

$h_{02}=2$; $h_{12}=0$; $h_{03}=6$; $h_{13}=1$.

This coder is the one represented in FIG. 4. It comprises:

two cascaded shift cells $\mathbf{141}_1$ and $\mathbf{141}_2$ which produce $X_0(k-1)T$ and $X_0(k-2)T$, respectively;

one shift cell $\mathbf{142}_1$ which produces $X_1(k-1)T$;

a first adder means $\mathbf{19}_1$ which produces the output data $Y_1$ and therefore receives:

the data $X_0(kT)$ multiplied by the coefficient $h_{01}^0$ in a multiplier means $\mathbf{6}_1$;

the data $X_0(k-1)T$ multiplied by the coefficient $h_{01}^1$ in a multiplier means $\mathbf{6}_2$;

the data $X_0(k-2)T$ multiplied by the coefficient $h_{01}^2$ in a multiplier means $\mathbf{6}_3$;

the data $X_1(kT)$ multiplied by the coefficient $h_{11}^0$ in a multiplier means $\mathbf{5}_2$;

the data $X_1(k-1)T$ multiplied by the coefficient $h_{11}^1$ in a multiplier means $\mathbf{5}_3$;

a second adder means $\mathbf{19}_2$ which produces the output data $Y_3$ and therefore receives:

the data $X_1(kT)$ multiplied by the coefficient $h_{13}^0$ in a multiplier means $\mathbf{5}_1$;

the data $X_0(k-1)T$ multiplied by the coefficient $h_{03}^1$ in a multiplier means $\mathbf{6}_5$;

the data $X_0(k-2)T$ multiplied by the coefficient $h_{03}^2$ in a multiplier means $\mathbf{6}_7$;

a third adder means $\mathbf{19}_3$ which produces the output data $Y_0$ and therefore receives:

the data $X_0(k-1)T$ multiplied by the coefficient $h_{00}^1$ in a multiplier means $\mathbf{6}_6$;

the data $X_0(k-2)T$ multiplied by the coefficient $h_{00}^2$ in a multiplier means $\mathbf{6}_8$;

the output data $Y_2$ is obtained by multiplying the data $X_0(k-1)T$ by the coefficient $h_{02}^1$ in a multiplier means $\mathbf{6}_4$.

Figure 5:
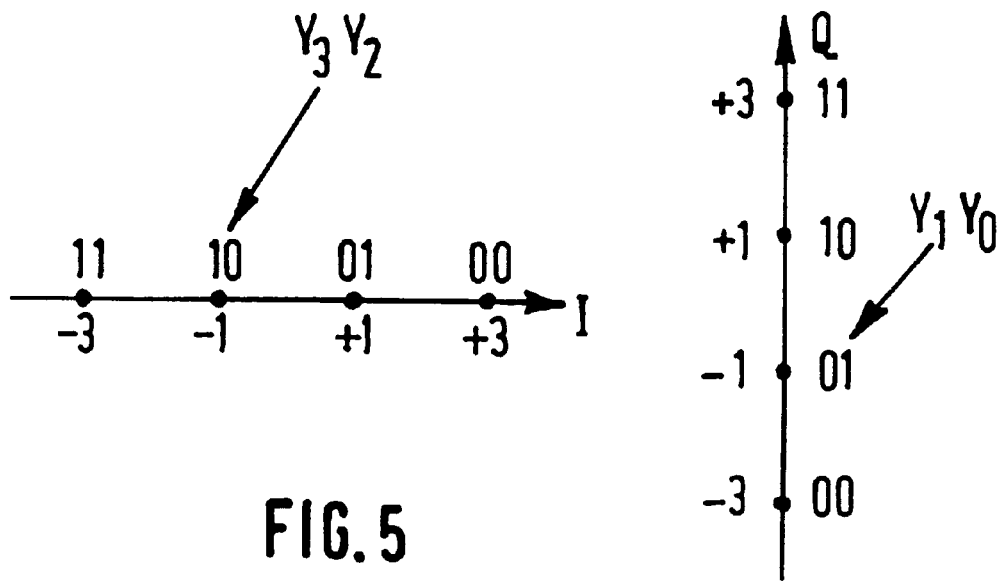
FIG. 5 gives two representations of two codings for two real components of a 4-AM modulation.

At an instant kT, the four bits $Y_0, Y_1, Y_2, Y_3$ select in the device 15 the in-phase component I and also the quadrature component Q of the 4-AM amplitude modulation (FIG. 5). In this case, the bits $Y_3, Y_2$ select the in-phase component I and the bits $Y_1, Y_0$ select the quadrature component Q. The four output bits regrouped to two pairs select a four-level symbol (+1, −1, +3, −3) that is to say, two real symbols of the four-level 4-AM amplitude modulation (two output bits per real symbol).

This allocation is represented in FIG. 5 and in the Tables I and II.

TABLE I

| (in-phase component) | | | | |
|---|---|---|---|---|
| $Y_3$ | 0 | 0 | 1 | 1 |
| $Y_2$ | 0 | 1 | 0 | 1 |
| I | +3 | +1 | −1 | −3 |

TABLE II

| (quadrature component) | | | | |
|---|---|---|---|---|
| $Y_1$ | 0 | 0 | 1 | 1 |
| $Y_0$ | 0 | 1 | 0 | 1 |
| Q | −3 | −1 | +1 | +3 |

Figure 6:
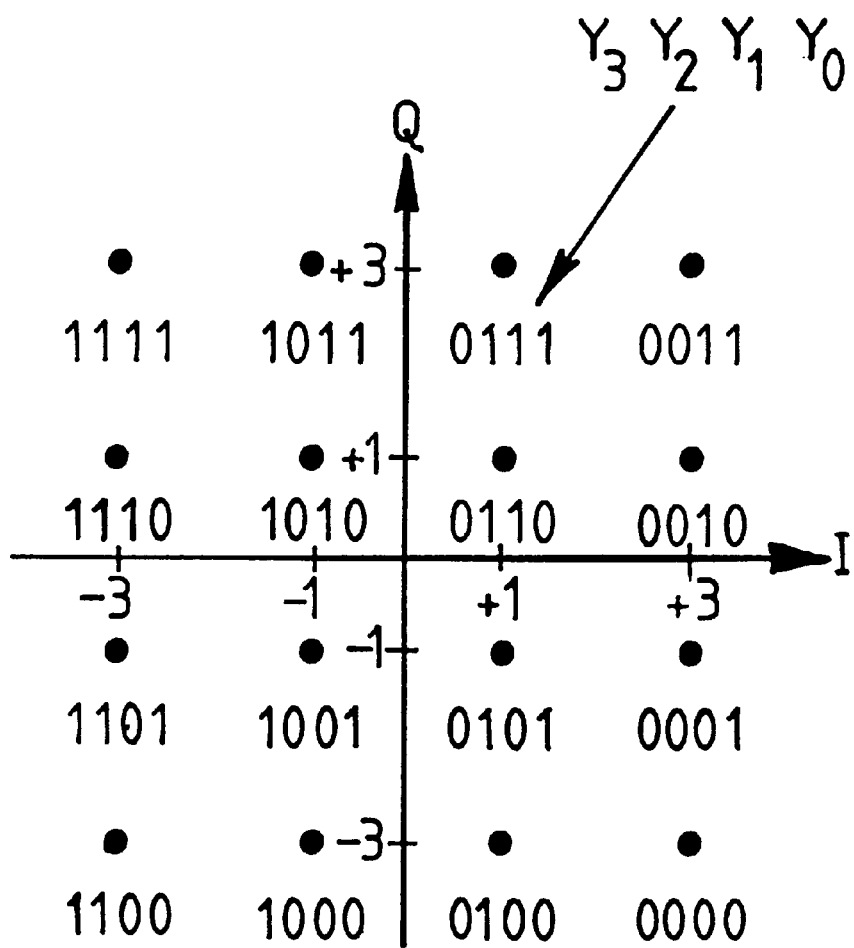
FIG. 6 gives a representation of a QAM16 constellation combining the two 4-AM components.

Then, when these two real symbols are combined, a complex symbol of the QAM16 constellation is obtained. Thus, the constellation is coded by utilizing two groups of amplitude modulation signals to obtain a symbol $U_k$ of the QAM16 constellation represented in FIG. 6. The allocation of the bits to the symbols is effected according to the Table III.

TABLE III

| SYMBOLS | | $Y_3$ | $Y_2$ | $Y_1$ | $Y_0$ |
|---|---|---|---|---|---|
| +3 | −3 | 0 | 0 | 0 | 0 |
| +3 | −1 | 0 | 0 | 0 | 1 |
| +3 | +1 | 0 | 0 | 1 | 0 |
| +3 | +3 | 0 | 0 | 1 | 1 |
| +1 | −3 | 0 | 1 | 0 | 0 |
| +1 | −1 | 0 | 1 | 0 | 1 |
| +1 | +1 | 0 | 1 | 1 | 0 |
| +1 | +3 | 0 | 1 | 1 | 1 |
| −1 | −3 | 1 | 0 | 0 | 0 |
| −1 | −1 | 1 | 0 | 0 | 1 |
| −1 | +1 | 1 | 0 | 1 | 0 |
| −1 | +3 | 1 | 0 | 1 | 1 |
| −3 | −1 | 1 | 1 | 0 | 0 |
| −3 | −3 | 1 | 1 | 0 | 1 |
| −3 | +1 | 1 | 1 | 1 | 0 |
| −3 | +3 | 1 | 1 | 1 | 1 |

Prior to transmission, the symbols are to undergo a puncturing coding. During the puncturing procedure, the transmission of certain symbols is prohibited as a function of a matrix (called puncturing matrix), and this is done periodically. The puncturing consists of not transmitting all the I and Q symbols at certain instants. An I symbol or a Q symbol could be omitted, which is defined by the puncturing matrix. A zero in the matrix means that the corresponding symbol is not transmitted. Symbols to be transmitted are regrouped to transmit complete complex symbols. Each row of the matrix relates to one of the components. In combination with the code of FIG. 4, with a punctured code having a period of R=3 (number of elements per row), the following matrix having dimension 2R has given remarkable results.

$$M = \begin{pmatrix} 1 & 0 & 0 \\ 1 & 1 & 1 \end{pmatrix}$$

Instead of transmitting 4R bits, only a smaller number of bits are transmitted, depending on the number of is in the matrix. Thus, with the matrix M, the puncturing permits of transmitting only four symbols during three periods out of the six symbols generated by the mother code having the 2/4 rate.

Thus, the rate of the punctured code becomes higher than that of the non-punctured code, that is to say, for the same number of information bits (on the input of the coder) the number of transmitted bits is smaller than that of the non-punctured code. For example, for a mother code having a 2/4 rate (four bits or two 4-AM modulation symbols transmitted per two useful bits) with a puncturing defined by the matrix M, the rate becomes equal to 3/4. Indeed, during the first period (first column of M), two information bits and two 4-AM symbols have been transmitted, thus one complex QAM16 symbol. During the second period, only one symbol (the first symbol) is maintained, which corresponds to the real portion of a QAM16 symbol. During the third period, also one symbol is maintained (the two first output bits of the 2/4 code) which will be allocated to the imaginary portion of a QAM16 symbol which can then be transmitted. Thus, during three periods there are two QAM16 symbols or eight bits for six information bits. This procedure is repeated with a period of three. The higher the rate, the less powerful the code is, which gives a higher error rate for the same signal-to-noise ratio.

When utilizing the same mother code (the 2/4 rate in the given example), different protections may be obtained for the various bit streams simply by changing the puncturing matrix allocated to each bit stream. It is thus no use changing the coder and the Viterbi decoder during the transmission of various bit streams which have different protections.

The same puncturing matrix as that used at the transmitting end is used at the receiving end for each bit stream. It is sufficient to multiply the computed metrics by the corresponding puncturing matrix. For each zero of the puncturing matrix is given a zero value in the corresponding matrix, which boils down to an inhibition of transmitting these zero metrics.

The performance of a transmission system operating with a puncturing coding applied to a quadrature amplitude modulation will be different depending on the rate of the code used and on the puncturing matrix associated thereto. Certain associations of code/matrix will yield more or less outstanding results. The search for the best associations is based on the maximization of the minimum euclidian distance between two sequences whatever the trellis code and on the minimization of the number of nearest neighboring values for the respective digital modulation.

By applying such a method, various convolutional codings are determined which have a particularly interesting performance. By defining the coders by their generator polynomials (equation 3), certain of these coders are given in Table IV. The codes denoted $G_i^{op}$ correspond to an optimum code having $2^i$ states for a linear channel having white additive Gaussian noise. The codes denoted $R_i^{op}$ correspond to an optimum code having $2^i$ states for a fading Rayleigh channel. The code $G_4^{so}$ is a sub-optimum code having 16 states for a Gaussian channel.

TABLE IV

| | v | $h_{00}$ | $h_{10}$ | $h_{01}$ | $h_{11}$ | $h_{02}$ | $h_{12}$ | $h_{03}$ | $h_{13}$ |
|---|---|---|---|---|---|---|---|---|---|
| $G^{op}_3$ | 3 | 6 | 0 | 7 | 3 | 2 | 0 | 6 | 1 |
| $G^{op}_4$ | 4 | 2 | 0 | 7 | 3 | 2 | 2 | 7 | 4 |
| $G^{so}_4$ | 4 | 7 | 7 | 3 | 4 | 2 | 2 | 7 | 5 |
| $G^{op}_5$ | 5 | 6 | 6 | 9 | 5 | 5 | 1 | 2 | 7 |
| $R^{op}_3$ | 3 | 6 | 1 | 5 | 3 | 2 | 2 | 6 | 3 |
| $R^{op}_4$ | 4 | 5 | 3 | 7 | 6 | 5 | 6 | 7 | 1 |

The coding having a 2/4 rate described previously may be combined with various puncturing matrices to obtain different global R/S rates. The R/S rate is defined by:

the number R of rows of the puncturing matrix;

the number S of "1" values of the puncturing matrix.

Thus, the following matrix:

$$M' = \begin{pmatrix} 1 & 1 & 0 & 1 & 0 & 0 \\ 0 & 1 & 1 & 1 & 1 & 1 \end{pmatrix}$$

which has six columns and eight "1" values leads to a rate of R/S=6/8.

In the case where the coder $G_3^{op}$ having the 2/4 rate has three shift cells, thus a $2^3=8$-state trellis code, according to the invention this coder is associated to various matrices M so as to obtain optimized performance for various rates R/S.

In the case of a Gaussian channel, certain of these results are indicated in the Table V in which appear:

the first row of the matrix;

the second row of the matrix;

the R/S rate resulting therefrom;

the signal-to-noise degradation $\Delta(E_b/N_0)$ measured in decibels (dB);

the minimum euclidian distance of the code $d_f^2$.

The matrix $$\begin{pmatrix} 1 \\ 1 \end{pmatrix}$$

which corresponds to a non-puncturing, is here used as a reference in the Table.

TABLE V

| MATRIX | | | Δ | |
|---|---|---|---|---|
| 1st row | 2nd row | R/S | (db) | $d_f^2$ |
| 1 | 1 | 1/2 | 0.00 | 44.0 |
| 111110 | 111111 | 6/11 | 1.59 | 28.0 |
| 11110 | 11111 | 5/9 | 2.17 | 24.0 |
| 1110 | 1111 | 4/7 | 2.84 | 20.0 |
| 111100 | 111111 | 6/10 | 1.84 | 24.0 |
| 110 | 111 | 3/5 | 3.60 | 16.0 |
| 11100 | 11111 | 5/8 | 2.46 | 20.0 |
| 111100 | 011111 | 6/9 | 3.14 | 16.0 |
| 1111 | 1010 | 4/6 | 3.14 | 16.0 |
| 11 | 10 | 2/3 | 3.14 | 16.0 |
| 1111010 | 1010111 | 7/10 | 4.18 | 12.0 |
| 11100 | 01111 | 5/7 | 4.09 | 12.0 |
| 110100 | 011111 | 6/8 | 3.88 | 12.0 |
| 100 | 111 | 3/4 | 3.88 | 12.0 |
| 1000 | 1111 | 4/5 | 5.36 | 8.0 |
| 10100 | 01111 | 5/6 | 5.19 | 8.0 |
| 101000 | 011111 | 6/7 | 5.06 | 8.0 |
| 1001000 | 0111111 | 7/8 | 4.97 | 8.0 |
| 10001000 | 11110111 | 8/9 | 4.90 | 8.0 |
| 100010000 | 011111111 | 9/10 | 4.85 | 8.0 |

In the case of a coder having a 2/4 rate and four shift cells such as the coder $G_4^{so}$ of the Table IV, thus a code having $2^4=16$ states, the puncturing matrices which may be combined to this coder for obtaining optimum performance are indicated in Table VI. Though being slightly sub-optimum for R/S=1/2 compared to the coder $G_4^{op}$, the coder $G_4^{so}$ shows better performance when a puncturing is applied thereto.

TABLE VI

| MATRIX | | | Δ | |
|---|---|---|---|---|
| 1st row | 2nd row | R/S | (db) | $d_f^2$ |
| 1 | 1 | 1/2 | 0.00 | 48.0 |
| 111110 | 111111 | 6/11 | 1.38 | 32.0 |
| 11110 | 11111 | 5/9 | 1.30 | 32.0 |
| 1110 | 1111 | 4/7 | 2.43 | 24.0 |
| 110110 | 111111 | 6/10 | 2.22 | 24.0 |
| 110 | 111 | 3/5 | 2.22 | 24.0 |
| 11100 | 11111 | 5/8 | 2.04 | 24.0 |
| 101100 | 111111 | 6/9 | 3.52 | 16.0 |
| 1100 | 1111 | 4/6 | 2.55 | 20.0 |
| 10 | 11 | 2/3 | 3.52 | 16.0 |
| 1010100 | 1111111 | 7/10 | 3.31 | 16.0 |
| 10100 | 11111 | 5/7 | 3.22 | 16.0 |
| 101000 | 111111 | 6/8 | 4.26 | 12.0 |
| 101 | 110 | 3/4 | 4.26 | 12.0 |
| 1001000 | 1111111 | 7/9 | 4.10 | 12.0 |
| 1000 | 1111 | 4/5 | 3.98 | 12.0 |
| 10000 | 11111 | 5/6 | 3.80 | 12.0 |
| 101000 | 110111 | 6/7 | 5.44 | 8.0 |
| 1000000 | 1111111 | 7/8 | 5.35 | 8.0 |
| 10000000 | 11111111 | 8/9 | 5.28 | 8.0 |
| 101000000 | 110111111 | 9/10 | 5.23 | 8.0 |

In the case of a Rayleigh channel, that is to say, having fading, the convolutional codes and the puncturing matrices which may be combined thereto for obtaining the optimum performance will be different. The Table VII sums up certain combinations in the case of the optimum 8-state coder $R_3^{op}$ and of the optimum 16state coder $R_4^{op}$ given in the Table IV.

In the case of a Rayleigh channel, the optimum codes are those which present maximum diversity. The diversity is defined as the maximum number of different 4-AM symbols among them for two arbitrary trellis sequences. The diversity of the optimum codes having eight and sixteen states is indicated in the column DIV of Table VII.

TABLE VII

| | | 8-state coder MATRIX | | | 16-state coder MATRIX | |
|---|---|---|---|---|---|---|
| R/S | DIV | 1st row | 2nd row | DIV | 1st row | 2nd row |
| 1/2 | 4 | 1 | 1 | 6 | 1 | 1 |
| 6/11 | 3 | 111111 | 111110 | 5 | 111111 | 111110 |
| 5/9 | 3 | 11111 | 11110 | 5 | 11111 | 11110 |
| 4/7 | 3 | 1110 | 1111 | 5 | 1111 | 1110 |
| 6/10 | 3 | 110110 | 111111 | 4 | 110111 | 111110 |
| 3/5 | 3 | 110 | 111 | 4 | 111 | 110 |
| 5/8 | 3 | 11010 | 11111 | 4 | 11111 | 11010 |
| 6/9 | 3 | 101010 | 111111 | 4 | 101111 | 111010 |
| 4/6 | 3 | 1010 | 1111 | 4 | 1011 | 1110 |
| 2/3 | 3 | 10 | 11 | 4 | 11 | 10 |
| 7/10 | 2 | 1010100 | 1111111 | 3 | 1110111 | 1101100 |
| 5/7 | 2 | 10100 | 11111 | 3 | 10111 | 11100 |
| 6/8 | 2 | 100100 | 111111 | 3 | 101111 | 111100 |
| 3/4 | 2 | 100 | 111 | 3 | 101 | 110 |
| 4/5 | 2 | 1011 | 1100 | 2 | 1011 | 1100 |
| 5/6 | 2 | 10000 | 11111 | 2 | 01011 | 11100 |
| 6/7 | 2 | 100000 | 111111 | 2 | 011011 | 101100 |
| 7/8 | 2 | 1000000 | 1111111 | 2 | 0010111 | 1111000 |
| 8/9 | 2 | 11100000 | 00111111 | 2 | 01001111 | 10110100 |
| 9/10 | 2 | 100000000 | 111111111 | 2 | 010011111 | 101100100 |

A convolutional code may be represented by a $2^v$ state trellis, where v is the number of cells. The state corresponds to the bits stored in these cells. A transition from one state to another due to the shift of the data is represented by a branch connecting two nodes in the trellis.

FIG. 7 represents the eight-state trellis of the coder $G_3^{op}$ (Table IV) represented in FIG. 4, in which each branch represents a transition between two states. The states are denoted S0, S1, S2, where S0 are the contents of cell $141_1$, S1 are the contents of cell $141_2$ and S2 are the contents of the cell $142_1$. For each state has also been indicated the QAM16 symbols corresponding respectively to the bits $X_0$, $X_1$ equal to 00, 10, 01 and 11. Thus, to each branch from the node A to the node B may be allocated the value of the two bits on the input of the coder and the values of the four coded bits on the output of the coder. The two output bits or, similarly, the two real symbols +1, −1, +3, −3 are a function of the actual state of the coder (node A) and of the input bits. This also applies to the future state of the coder (state after the shift) represented by node B.

At the receiving end, the metrics computation unit 116 computes the metrics of the branches of the trellis. After this, a Viterbi decoding is performed. The metric of a branch corresponds to the squared euclidian distance between the two received real symbols and the two real symbols assigned to this branch, respectively. This branch metric is the sum of the two metrics of the two received symbols. This causes the convolutional code and puncturing code to be optimized in combination with the respective QAM modulation.

Let us consider by way of example a punctured code having a 3/4 rate. The matrix used is then $$\begin{pmatrix} 1 & 0 & 0 \\ 1 & 1 & 1 \end{pmatrix}$$

according to Table V. The Viterbi decoding comprises finding in the punctured code trellis the path (the sequence of branches or transitions) that is nearest to the direction of the euclidian distance relative to the received response (with noise). FIG. 8 represents paths formed by a sequence of branches. This trellis is formed by R successive branches of the trellis of FIG. 7. The distance between a path in the trellis and the received sequence (path metric) is equal to the sum of the metrics of the branches that form this path, where the metric of a branch is the euclidian distance between the two received real symbols and the two 4-AM symbols (+1, −1, +3, −3) assigned to this branch. A transition in the trellis corresponds to the transmission of 4-AM symbols.

When there is a puncturing of one of the two 4-AM symbols (that is two bits), the puncturing being indicated by PP in the trellis, only the metric of the non-punctured symbol is computed, that is to say, the squared euclidian distance between the received real symbol and the non-punctured 4-AM real symbol assigned to the branch. This boils down to forcing the metric of the punctured symbol to zero. In FIG. 8, the path T is the correct transmission path and the path E is the estimated path.

What is claimed is:

1. A selective protection digital transmission system comprising a transmitter and a receiver, the transmitter including first convolutional coding means for coding data, second coding means for applying a coding by puncturing and means for allocating the coded data to digitally modulated symbols, characterized in that the first coding means provide a convolutional trellis coding having an N/2N rate, where N is an integer greater than 1, while the convolutional coding is combined with a $2^{2N}$-state quadrature amplitude modulation and the puncturing coding is applied to the symbols.

2. A system as claimed in claim 1, characterized in that the convolutional coding has a 2/4 rate, which coding is combined with a QAM16 digital modulation, the coding and the puncturing being combined for providing optimum performance.

3. A system as claimed in claim 2, characterized in that the first coding means comprise three shift cells for delaying two input data and means for linearly combining the two input data with the delayed input data to produce four output data.

4. A system as claimed in claim 2, characterized in that the first coding means comprise shift cells for delaying the input data and means for linearly combining the input data with the delayed input data to produce output data.

5. A system as claimed in claim 1, characterized in that the convolutional coding has a 3/6 rate, which coding is combined with a digital QAM64 modulation, the coding and the puncturing being combined to provide optimum performance.

6. A system as claimed in claim 5, characterized in that the first coding means comprise shift cells for delaying the input data and means for linearly combining the input data with the delayed input data to produce output data.

7. A system as claimed in claim 1, characterized in that the first coding means comprise shift cells for delaying the input data and means for linearly combining the input data with the delayed input data to produce output data.

8. A selective protection method implemented in a digital transmission system, the method comprising the steps of:
   convolutional coding of input data into output data,
   puncturing of the convolutional coding by applying at least one puncturing matrix,
   allocating data to digitally modulated symbols,
characterized in that the convolutional coding is a convolutional trellis coding having an N/2N rate, where N is an integer greater than 1, while the convolutional coding is combined with a $2^{2N}$-state quadrature amplitude modulation and the puncturing coding is applied to the symbols.

9. A method as claimed in claim 8, characterized in that the convolutional trellis coding and the puncturing coding are combined to provide optimum performance.

10. A transmitter for a digital transmission with selective protection, the transmitter comprising first convolutional coding means for coding data, second coding means for applying a puncturing coding and means for allocating the coded data to digitally modulated symbols, characterized in that the first coding means provide a convolutional trellis coding having an N/2N rate, where N is an integer greater than 1, while the convolutional coding is combined to a $2^{2N}$-state quadrature amplitude modulation and the puncturing coding is applied to the symbols.

11. A transmitter as claimed in claim 10, characterized in that the convolutional coding has a 2/4 rate, which coding is combined with a digital QAM16 modulation, the coding and the puncturing being combined to provide optimum performance.

12. A transmitter as claimed in claim 11, characterized in that the first coding means comprise three shift cells for delaying two input data and means for linearly combining the two input data with the delayed input data to produce four output data.

13. A transmitter as claimed in claim 10, characterized in that the convolutional coding has a 3/6 rate, which coding is combined with a digital QAM64 modulation, the coding and the puncturing being combined to provide optimum performance.

14. A transmitter as claimed in claim 10, characterized in that the first coding means comprise shift cells for delaying the input data and means for linearly combining the input data with the delayed input data to produce output data.

15. A transmitter as claimed in claim 11, characterized in that the first coding means comprise shift cells for delaying the input data and means for linearly combining the input data with the delayed input data to produce output data.

16. A transmitter as claimed in claim 13, characterized in that the first coding means comprise shift cells for delaying the input data and means for linearly combining the input data with the delayed input data to produce output data.

* * * * *